Sept. 23, 1947.    R. E. PETERSON    2,427,873
PLIER TYPE FASTENER SETTING DEVICE
Filed Dec. 16, 1946
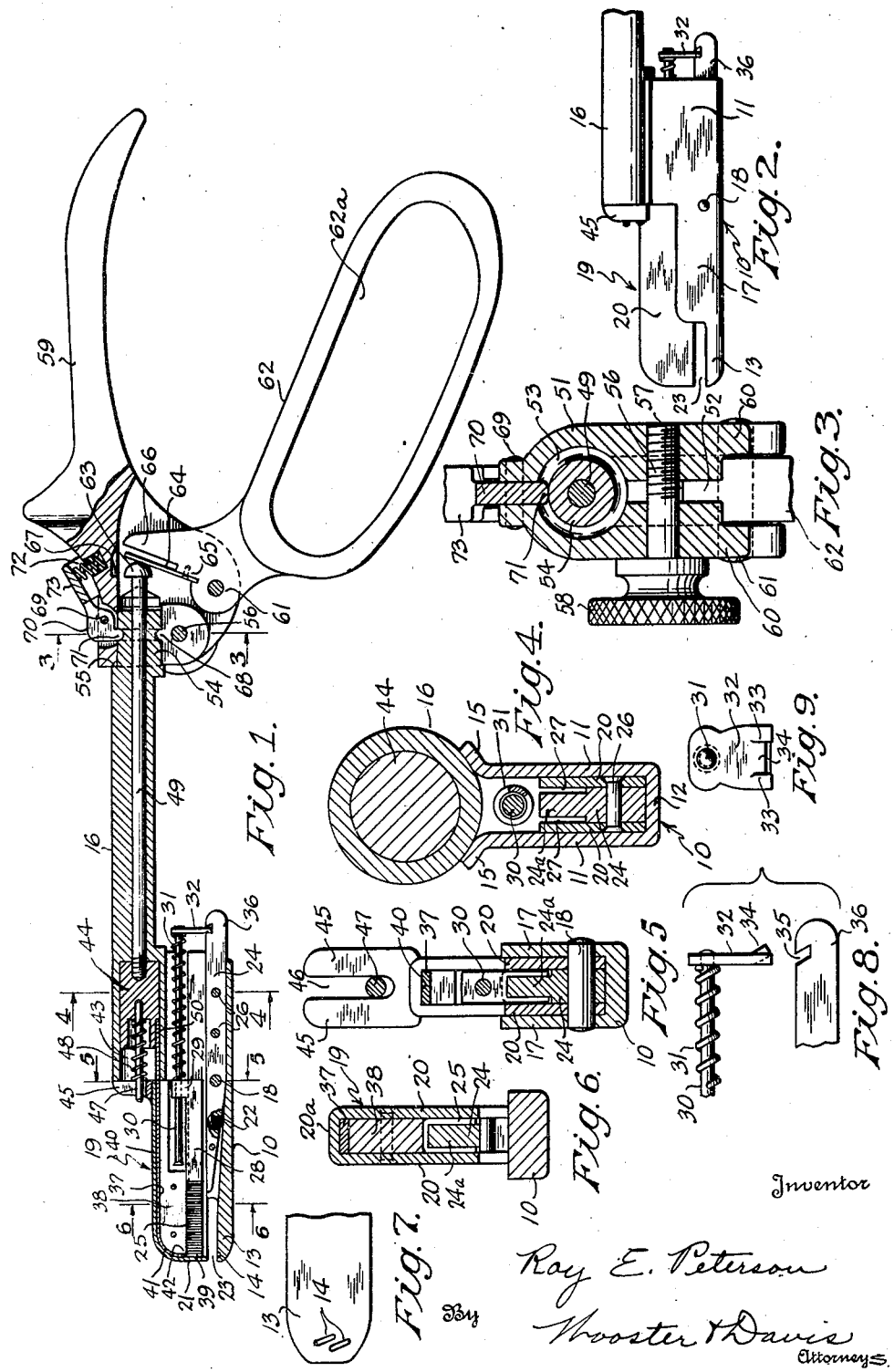
Inventor
Roy E. Peterson
By
Wooster & Davis
Attorneys Patented Sept. 23, 1947

2,427,873

UNITED STATES PATENT OFFICE 2,427,873

PLIER TYPE FASTENER SETTING DEVICE

Roy E. Peterson, Norwalk, Conn., assignor, by mesne assignments, to Hotchkiss Realty Corporation, Norwalk, Conn., a corporation of Delaware Application December 16, 1946, Serial No. 716,534

16 Claims. (Cl. 1—49)

1

This invention relates to a fastener setting device, and particularly to a plier type device of this character for setting the U-shaped type of staple fasteners, although it is not necessarily limited to use with this type of fastener.

It has for an object to provide a fastener setting device of this type which is easily adapted for stapling together skin tissue after cuts and injuries, cut arteries and so forth, in place of the present practice of stitching such cuts and injuries.

It is also an object to provide a construction by which the fasteners may be set at inaccessible locations, and by which elements to be connected may be readily reached in such inaccessible locations as corners or behind other objects, for fastening bandages, and the like.

A further object is to provide a construction in which there is an improved hand grip for operating the fastener setting mechanism, and which is so connected with this mechanism that it may be turned to any angular relation with respect to the fastener setting point.

A still further object is to provide a construction in which the fastener setting mechanism may be easily and quickly detached from and connected with the hand operating mechanism, to permit the operator to quickly change from one type, or size, of fastener to another without requiring the use of a complete machine for each type or size.

With the foregoing and other objects in view, I have devised the construction illustrated in the accompanying drawing forming part of this specification. It is, however, to be understood the invention is not limited to the specific details of construction and arrangement shown, but may embody various changes and modifications within the scope of the invention.

In this drawing:

Fig. 1 is a partial side elevation and partial longitudinal section through the device;

Fig. 2 is a side elevation of the head portion in which is located the fastener setting mechanism;

Figs. 3, 4, 5 and 6 are detail sections on an enlarged scale taken substantially on lines 3—3, 4—4, 5—5 and 6—6, respectively, of Fig. 1;

Fig. 7 is a top plan view of one type of anvil that may be used;

Fig. 8 is a detail side view of part of the fastener feed assembly, and

Fig. 9 is a side view of the plate element of Fig. 8.

This device is designed primarily for use in fastening together skin tissue after being cut or injured, or closing artery cuts and the like, in place of the usual stitching now employed by surgeons, as the fasteners, such as metal staples, for example, may be set more quickly and may be more easily removed after healing. It is also so constructed that the fasteners may be set in inaccessible locations, or locations inaccessible to the usual type of staple setting devices. In the form illustrated in the drawing, a construction is shown for setting the U-shaped wire staple, in which the laterally spaced prongs of the U-shaped staple are forced through the elements to be fastened together by means of a movable driver, and pressed against a suitable anvil for folding the prongs over against the opposite side of the connected elements, but, of course, it is not limited to this type of fastener, but is suitable for use with any desired type of pronged fastener.

The form of device shown comprises a base member 10, including a substantially U-shaped portion comprising the upright side portions 11 and connecting bottom portion 12. The portion 12 is extended from one end to form an anvil 13, in the upper surface of which may be any suitable arrangement of curved recesses 14 for folding over the prongs of the staple. In the arrangement of these recesses shown in Fig. 7, they are spaced somewhat laterally and overlap so as to set the prongs in a similar overlapped relation, but it will be understood any of the usual type of anvil recesses may be used, such, for example, as to fold the prongs inwardly and set them in a straight line or fold them outwardly in a straight line, or one inwardly and one outwardly, and so on. Secured in the opposite end of the base member, and preferably between the outwardly turned upper edges 15 of the side members 11, is an extension member 16. This is preferably a tubular member, but may be of other forms if found desirable. The attaching end portion is seated on the outwardly extending edges 15, as shown in Fig. 4, and secured thereto by any suitable means, such, for example, as silver solder, welding, or any other suitable means.

Extending forwardly from the higher portions of the side members 11, and between them and the anvil 13, these side members are of less height, as shown at 17. Between these side members and pivoted thereto at 18 by any suitable means, such as a cross pin, is a body member 19. This body member is of substantially inverted U-shape, as shown in Figs. 5 and 6, including the upright side members 20 extending between the side members 11 of the base, and the pivot pin 18 extends through the lower portion of the side members and the side portions 17, as shown in Fig. 5. Because of this pivotal connection the forward end 21 of the body member 19 may be tipped toward the anvil 13 for a purpose presently to be described, and has a spring 22 tending to tip it in the opposite direction to the position shown in Figs. 1 and 2, with the head portion 21 spaced above the anvil 13 to leave a space 23 between them for insertion of the elements to be fastened together. Mounted within the body member 19 at the lower part thereof, and extending longitudinally, is a guide member 24 for a strip of fasteners, in the example shown a strip of substantially U-shaped staples 25. This guide bar 24 is secured between the side walls 20 of the body by any suitable means, such as transverse rivets 26, and the upper portion 24a is cut away at the sides, as indicated at 27, to provide a pathway for passage of the prongs of the staples. Mounted to slide on the top of this guide bar is a follower 28, preferably of sheet metal in a substantially inverted U shape so as to straddle the reduced upper portion 24a of the bar 24, and engage the end of the staple strip 25 to feed it forwardly on the guide bar. The rear end portion of the follower 28 is extended upwardly, as shown at 29, forming a loop to embrace the spring supporting rod 30, which is embraced by the coil spring 31 pressing at its opposite end against a plate 32 secured to the rod 30. The lower end of this plate 32 is cut at laterally spaced points 33 to form a tongue 34 bent backwardly and seated in a similarly shaped notch 35 in an extension 36 on the rear end of the guide bar 24. This lug 34 and notch 35 form a readily releasable connection between the plate 32 and the staple guide bar 24. By lifting the plate from the notch 35 the spring and the follower 28 may be withdrawn from the feed end of the guide bar 24, a strip of staples 25 placed on this bar, then the follower and spring replaced, the spring being compressed to force the follower forwardly to feed the staple strip forwardly on the bar 24 to successively feed the individual staples to the driving position.

Mounted in the body 19 is a fastener driver 37. This, in the form of the device shown, is a flat strip of flexible steel, and is mounted for longitudinal sliding movements in a guide way in the body 19. This guideway is formed at its lower side by a block 38 mounted between the side walls 20 and spaced sufficiently below the top wall 20a to form a guideway for the driver 37. This guideway includes an upright portion 39 at the forward end of the fastener guide bar 24, which forms an outlet portion of the guideway facing the anvil recesses 14, and the guideway includes a horizontal portion 40 extending longitudinally of the fastener guide bar 24, but spaced above it, and these two portions of the guideway are connected by a curved portion 41. The fastener driver 37, being flexible, can adapt itself to the shape of this guideway and can readily pass around the curved portion thereof. When in the retracted position the forward end 42 of the driver is spaced just above the forward staple of the staple strip 25 which is in the outlet portion 39 of the guideway. This curved guideway for the fastener driver, with the flexible driver used therein, permits the use of elongated body and base members, as shown in Figs. 1 and 2, which are of relatively reduced height, so that the forward end portion thereof in which the fastener is set may be inserted into relatively narrow and inaccessible locations for setting the fastener, which is not possible with the ordinary type of fastener setting devices.

The forward end portion of the extension 16 is provided with a socket 43 in which is located the slidable block 44, and on its top wall the body 19 is provided with upwardly extending lugs 45 separated by a notch 46 in which extends a guide pin 47 for a coil spring 48. This spring engages at its opposite ends the block 44 and the upright lugs 45, and, therefore, tends to separate or force them apart. When compressed, this spring is strong enough to overcome the action of the spring 22 and tip the forward end of the body 19 downwardly to press the forward end of this body against the articles on the anvil to be fastened, but when the block 44 is retracted the spring 22 may tip the body 19 in the opposite direction to the position shown in Figs. 1 and 2. This spring 48 holds the block 44 and driver 37 in the retracted position, and moves them to this position after a fastener is set and pressure on the operating lever 62 is released.

Mounted in the tubular extension 16 and slidable longitudinally therein, is an operating rod 49 connected to the block 44, and as the flexible fastener driver 37 is connected at 50 to the block 44, operation of the rod 49 will operate the driver to the left, as viewed in Fig. 1, to force its forward end 42 downwardly and force the staple under this end in the outlet portion 39 of the guideway to cooperate with the anvil 13 to set the fastener in the article to be fastened.

Operating means for the rod 49 is attached to the outer end of the extension 16. In the form shown, it comprises a split block 51 which is split on its lower side, as at 52, leading to a socket 53, in which is seated the outer cylindrical end portion 54 of the extension 16. This extension is preferably provided with a shoulder 55 to limit movement of this end into the socket. This connection permits relative turning movements between the block 51 and the elements carried thereby, and the extension 16, about the longitudinal axis of the extension, and permits the placing of the fastener driving mechanism in any angular relation to the block and the operating handles carried thereby. This turning movement may be a full circular movement of 360° to permit maximum angular adjustment. A clamping screw 56 passes through the opposite sides of the block below the socket and is threaded to one of them, as shown at 57, and is provided with a knurled head 58, by means of which after the block 51 and the extension 16 are relatively adjusted, they may be clamped in this position by means of the screw 56.

The fastener driver operating mechanism on the block comprises a rigid handle 59 of any desired shape, and positioned at any desired location thereon, and pivoted between the side members 60 at 61 is a hand lever 62, which, if preferred, may be provided with any suitable hand loop 62a for the fingers of the operator to secure a better grip. The operating rod 49 projects from the end of the extension 16, and is provided with a rounded head 63 engaging a relatively heavy spring plate 64 mounted at 65 in the lever 62 and spaced at its free end portion therefrom so as to permit the spring to yield should the fastener driver become jammed or meet an unusual resistance, and thus prevent the operator from forcing the driver against the anvil, or placing an unusual pressure or strain on the driver, or its operating mechanism, to break them or force them out of shape. There may be an extension 66 on the lever adapted to engage a stop shoulder 67 on the block to limit upward movement of the lever 62, and thus prevent the operator from putting sufficient force on the device to force the spring 64 against the solid part of the lever to nullify the protective effect of the spring.

There is also a detachable connection between the extension 16 and the handle and lever block 51. For this purpose the outer end of the extension 16 is provided with an annular shoulder, which is engaged by a releasable catch on the block to retain the extension 16 in the block to permit the relative turning movements as above described. In the arrangement shown the shoulder is provided by an annular groove 68 in the outer reduced end portion 54 of the extension 16, and pivotally mounted in the block at 69 is a spring pressed catch 70, having a lug 71 seating in the groove 68 to secure the elements together, with a spring 72 to hold this lug in the groove. By merely pressing on the finger extension 73 the catch may be easily and quickly released to permit separation of the staple driving mechanism and the operating hand mechanism in the block 51. This permits easy and quick substitution of different fastener setting mechanisms in the manual operating block device, such, for example, as substituting fastener mechanisms for different types or sizes of fasteners, and also permits separation of the hand mechanism and the fastener driving means for ready storage in the physician's bag with less space required.

It will be seen that with this novel type of fastener setting mechanism, and particularly the use of the curved guideway in combination with a flexible steel driver operable in this guideway, the fastener setting mechanism may be mounted in an elongated base and body construction of relatively narrow width and height, so that its free end, in which the fastener is set, may be inserted in restricted and inaccessible spaces for setting of the fasteners in such location, and this facility is further increased by use of the extension 16 carrying the operating rod 49 between the fastener setting mechanism in the body and base and the manually operable mechanism in the block assembly connected to this extension for operating the fastener driving mechanism. As it will be seen this extension 16 may be made of a relatively small transverse section, and may be made of practically any length desired, with a corresponding increase in the length of the operating rod 49.

This construction and arrangement makes it readily possible for an operator to use staple fasteners for connecting together skin tissue after cuts or injuries, or connecting and closing cuts or injuries to arteries, fasten bandages or other articles in inaccessible or restricted locations.

Having thus set forth the nature of my invention, I claim:

1. A fastener setting device comprising a base section including an anvil, a body section pivoted to the base section, a fastener guide in said body leading to a position facing the anvil, said body being provided with a curved fastener driver guideway including a portion at the outlet end of the fastener guide facing the anvil and extending at substantially right anglest hereto and another portion substantially parallel to said fastener guide, a flexible fastener driver in said guideway and adapted to force a fastener in the first portion of the driveway through elements on the anvil, and means movable longitudinally of the second portion of the guidway to operate said driver.

2. A fastener setting device comprising a fastener driver guideway including portions positioned at substantially right angles to each other connected by a curved portion, a flexible fastener driver in said guideway, means for feeding fasteners in succession to one of the first mentioned portions of said guideway, and means movable longitudinally of the other of said first mentioned portions to operate the driver to drive the fastener in the first portion.

3. A fastener setting device comprising a guideway including substantially straight portions located at an angle to each other and connected by an intermediate curved portion, a flexible fastener driver in said guideway, means for feeding a fastener to one of said straight portions of the guideway in front of one end of the driver, and means movable longitudinally of the other straight portion of the guideway to operate the driver to set the fastener.

4. A fastener setting device comprising a base member including an anvil provided with recesses for setting the prongs of a pronged fastener, a body member pivoted to the base member, a curved guideway in the body member including an outlet portion facing said anvil recesses and a portion extending substantially parallel with the anvil with an intermediate curved portion connecting the first portion, a flexible fastener driver in the guideway, means for feeding pronged fasteners in succession to the outlet portion of the guideway forwardly of the driver, and means movable longitudinally of the second mentioned portion of the guideway to operate the driver to set the fasteners.

5. A fastener setting device comprising a base member including an anvil adjacent one end, a tubular extension projecting from the other end of the base, a body member pivoted to the base, said body being provided with a guideway including an outlet portion facing the anvil, a second portion extending longitudinally of the base and a curved intermediate portion connecting the first portions, a flexible staple driver in the guideway, means for feeding pronged fasteners in succession to the outlet portion of the guideway forwardly of the driver, a slidable rod in the tubular extension connected with the driver for operating it, and manually operable means connected with the extension for operating said rod.

6. A fastener setting device comprising a base member including an anvil adjacent one end, a tubular extension projecting from the other end of the base, a body member pivoted to the base, said body being provided with a guideway including an outlet portion facing the anvil and a curved portion leading to the outlet portion, a flexible fastener driver in said guideway, a slidable rod in the extension connected with the driver for operating it, a spring tending to retract the rod and driver, means for feeding pronged fasteners in succession to the outlet portion of the guideway forwardly of the driver, and manually operable means connected with the extension for operating said rod.

7. A fastener setting device comprising a base member including an anvil adjacent one end, a tubular extension projecting from the other end of the base, a body member pivoted to the base, said body being provided with a guideway including an outlet portion facing the anvil and a curved portion leading to the outlet portion, a flexible fastener driver in said guideway, a slidable rod in the extension connected with the driver for operating it, a spring between the body and the rod tending to retract the driver and to tip the body toward the anvil, a second spring to tip the body in the opposite direction when the driver is retracted, means for feeding pronged fasteners to the outlet portion of the guideway forwardly of the driver, and manually operable means connected with the extension for operating said rod and driver to set the fasteners.

8. A fastener setting device comprising a base member including an anvil adjacent one end, a tubular extension projecting from the other end of the base, a body member pivoted to the base, said body being provided with a guideway including an outlet portion facing the anvil and a curved portion leading to the outlet portion, a flexible fastener driver in said guideway, a slidable block in the base member connected with the driver, a shoulder on the body, a spring between the shoulder and said block and operable to tip the body toward the anvil on operation of the block, a second spring to tip the body in the opposite direction when the block is retracted, means for feeding pronged fasteners in succession to the outlet portion of the guideway forwardly of the driver, a slidable rod in the extension connected to the block for operating it and the driver to set the fasteners, and manually operable means connected with the extension for operating said rod.

9. A fastener setting device comprising a base member including an anvil adjacent one end, a tubular extension projecting from the other end of the base, a body member pivoted to the base, said body being provided with a guideway including an outlet portion facing the anvil, a fastener driver in the guideway, means for feeding pronged fasteners in succession to the guideway forwardly of the driver, a block at the outer end of the extension including a rigid handle, means securing the extension to the block for turning movements in the block about the axis of the extension, means securing the extension in different angular positions, and an operating handle pivoted to the block and connected with the rod for operating it and the driver to set the fasteners.

10. A fastener setting device comprising a base member including an anvil adjacent one end, a tubular extension projecting from the other end of the base, a body member connected with the base provided with a guideway having an outlet facing the anvil, a fastener driver in the guideway, means for feeding pronged fasteners in succession to the guideway forwardly of the driver, a rod slidable in the extension connected with the driver for operating it and exposed at the outer end of the extension, a block including a rigid handle connected with the outer end of the extension for relative turning movement of the extension and the block about the axis of the extension, and an operating handle pivoted to the block and provided with means engaging the end of the rod to operate it.

11. A fastener setting device comprising a base member including an anvil adjacent one end, an extension projecting from the other end of the base, means mounted on the base including a fastener driver adapted to cooperate with the anvil to set pronged fasteners, means for feeding pronged fasteners in succession to driving position forwardly of the driver, means connected with the driver and mounted in the extension for sliding movement longitudinally thereof to operate the driver, a block including a rigid handle connected with the outer end of the extension for relative turning movement between the extension and block about the axis of the extension, a manually operable lever pivoted to the block at one side of the handle, and means on the lever for operating the driver operating means.

12. A fastener setting device comprising a base member including an anvil adjacent one end, a tubular extension projecting from the other end of the base, a fastener driver mounted to cooperate with the anvil to set pronged fasteners, means for feeding pronged fasteners in succession to driving position forwardly of the driver, a rod mounted in the extension for longitudinal sliding movement and connected with the driver for operating it, a block including a rigid handle, a swivel connection between the extension and block to permit relative turning movements between them about the axis of the extension and including releasable means to permit disconnection of the extension and block, means for clamping the extension in different angular positions, a manually operable lever pivoted to the block at one side of the handle, and means on the lever for operating said rod to operate the driver.

13. A fastener setting device comprising a base member including an anvil adjacent one end, a tubular extension projecting from the other end of the base, a fastener driver mounted to coopertae with the anvil to set pronged fasteners, means for feeding pronged fasteners in succession to driving position forwardly of the driver, a rod mounted in the extension for longitudinal sliding movement and connected with the driver for operating it, a block including a rigid handle connected to the outer end of the extension, a manually operable lever pivoted to the block at one side of the handle, a spring on the lever engaging the rod to operate this rod and the driver, and cooperating stop means on the block and lever to limit movement of the lever in operating the driver.

14. A fastener setting device comprising a base member including an anvil adjacent one end, a tubular extension projecting from the other end of the base, a fastener driver mounted to cooperate with the anvil to set pronged fasteners, means for feeding pronged fasteners in succession to driving position forwardly of the driver, a rod mounted in the extension for longitudinal sliding movement and connected with the driver for operating it, a block including a rigid handle and provided with a socket split on one side, the outer end of the extension being seated in the socket, means securing the extension in the socket and permitting relative turning movements between the extension and the block about the axis of the extension, a clamping screw in the block adapted to clamp the split socket about the extension to hold it in adjusted positions, a lever pivoted to the block at one side of the handle, and means on the lever for operating the rod to operate the driver.

15. A fastener setting device comprising a base member including an anvil adjacent one end, a tubular extension projecting from the other end of the base, a fastener driver mounted to cooperate with the anvil to set pronged fasteners, means for feeding pronged fasteners in succession to driving position forwardly of the driver, a rod mounted in the extension for longitudinal sliding movement and connected with the driver for operating it, a block including a rigid handle and provided with a socket in which the outer end of the extension is seated, said extension being provided with an annular shoulder, a releasable catch on the block engaging the shoulder to retain the extension in the socket and form a swivel connection permitting relative turning movements between the extension and the block, a manually operable lever pivoted to the block at one side of the handle, and means on the lever for shifting the rod to operate the driver.

16. A fastener setting device comprising a guide bar for a strip of fasteners, a guideway at one end of said bar, a fastener driver mounted for reciprocating movement in the guideway to set fasteners fed to the guideway from said bar, means for feeding fasteners along the bar to the guideway comprising a follower guided on said bar, a rod connected to the follower, a plate on the outer end of the rod, a spring between the follower and the plate tending to feed the follower forwardly, an extension on the guide bar provided with a forwardly inclined recess in its upper edge, and said plate being provided with a backwardly inclined lug on its lower edge seated in said recess.

ROY E. PETERSON.